Figure 1:
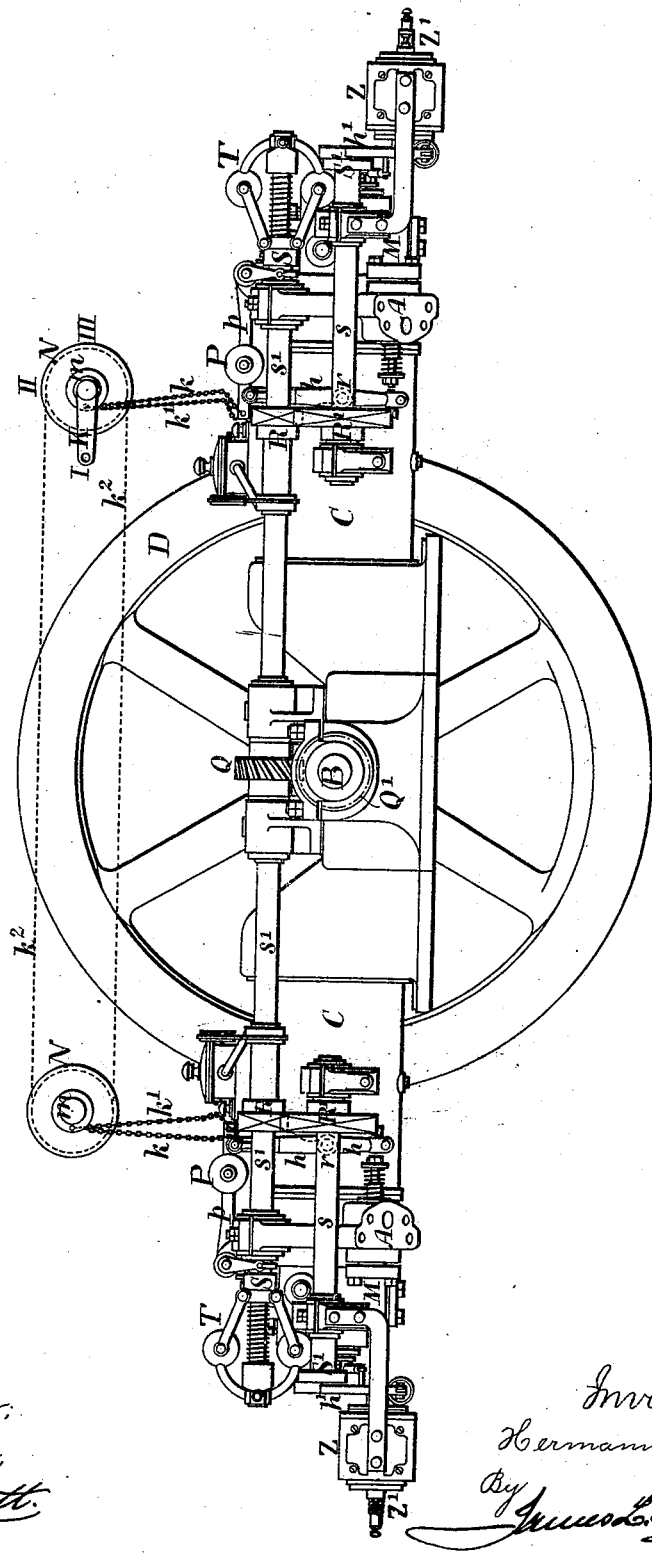

(No Model.)  4 Sheets—Sheet 1.

H. SCHUMM.
GAS OR OIL MOTOR ENGINE.

No. 510,712.  Patented Dec. 12, 1893.

Witnesses:
G. W. Rea,
Robert Everett.

Inventor:
Hermann Schumm
By James L. Norris.
Atty

THE NATIONAL LITHOGRAPHING COMPANY,
WASHINGTON, D. C.

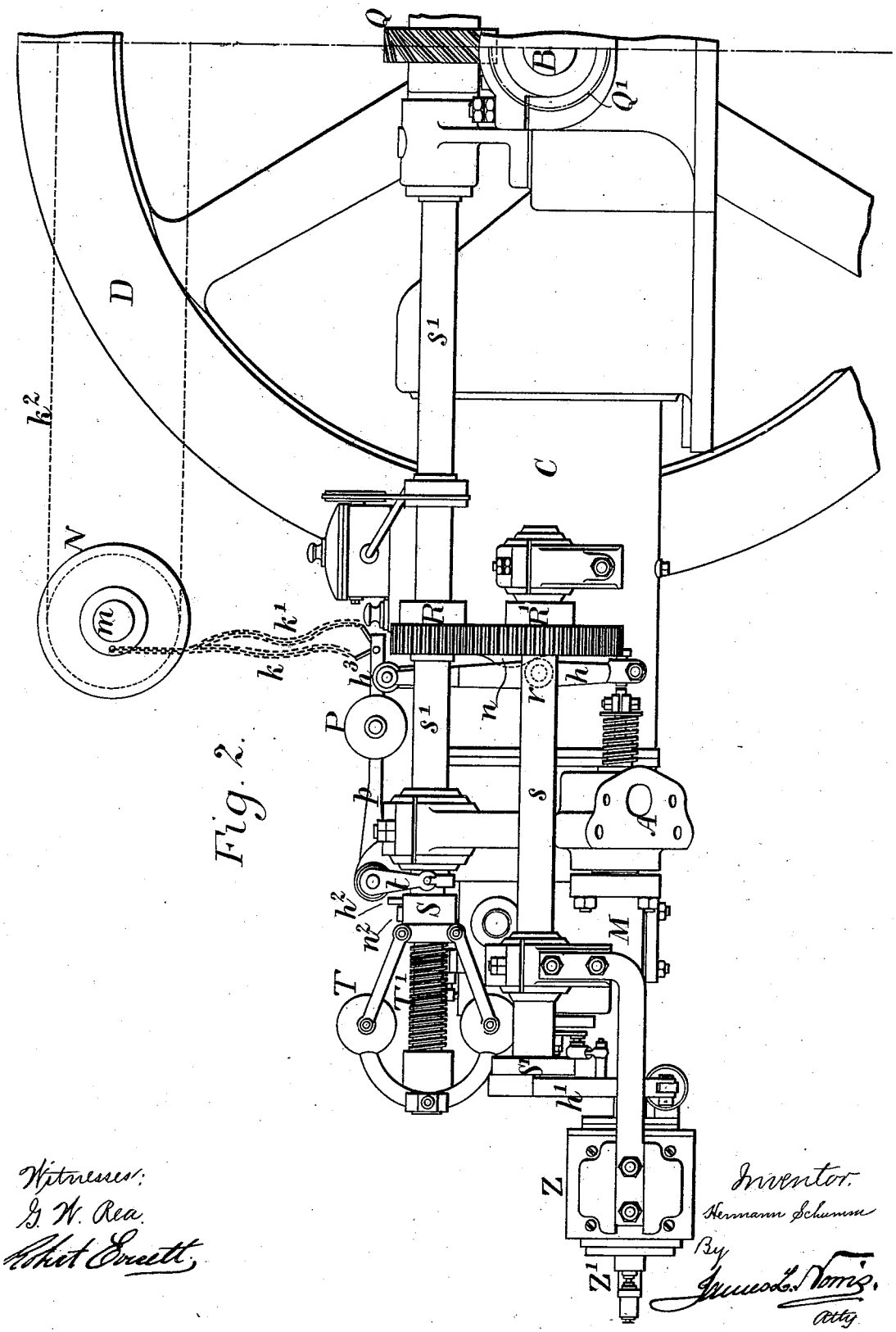

(No Model.) 4 Sheets—Sheet 3.
H. SCHUMM.
GAS OR OIL MOTOR ENGINE.
No. 510,712. Patented Dec. 12, 1893.
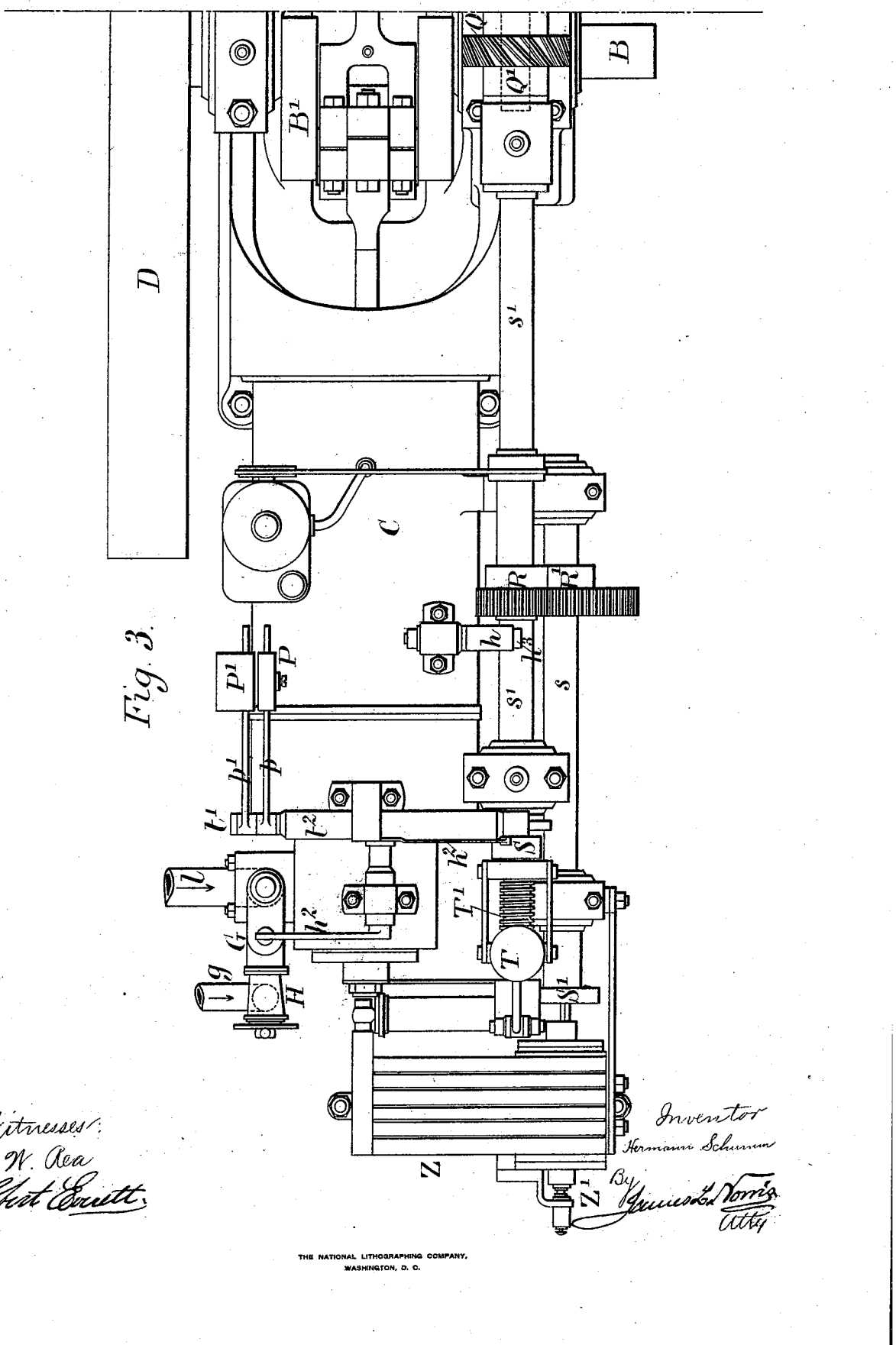

(No Model.)
H. SCHUMM.
GAS OR OIL MOTOR ENGINE.
No. 510,712.  Patented Dec. 12, 1893.
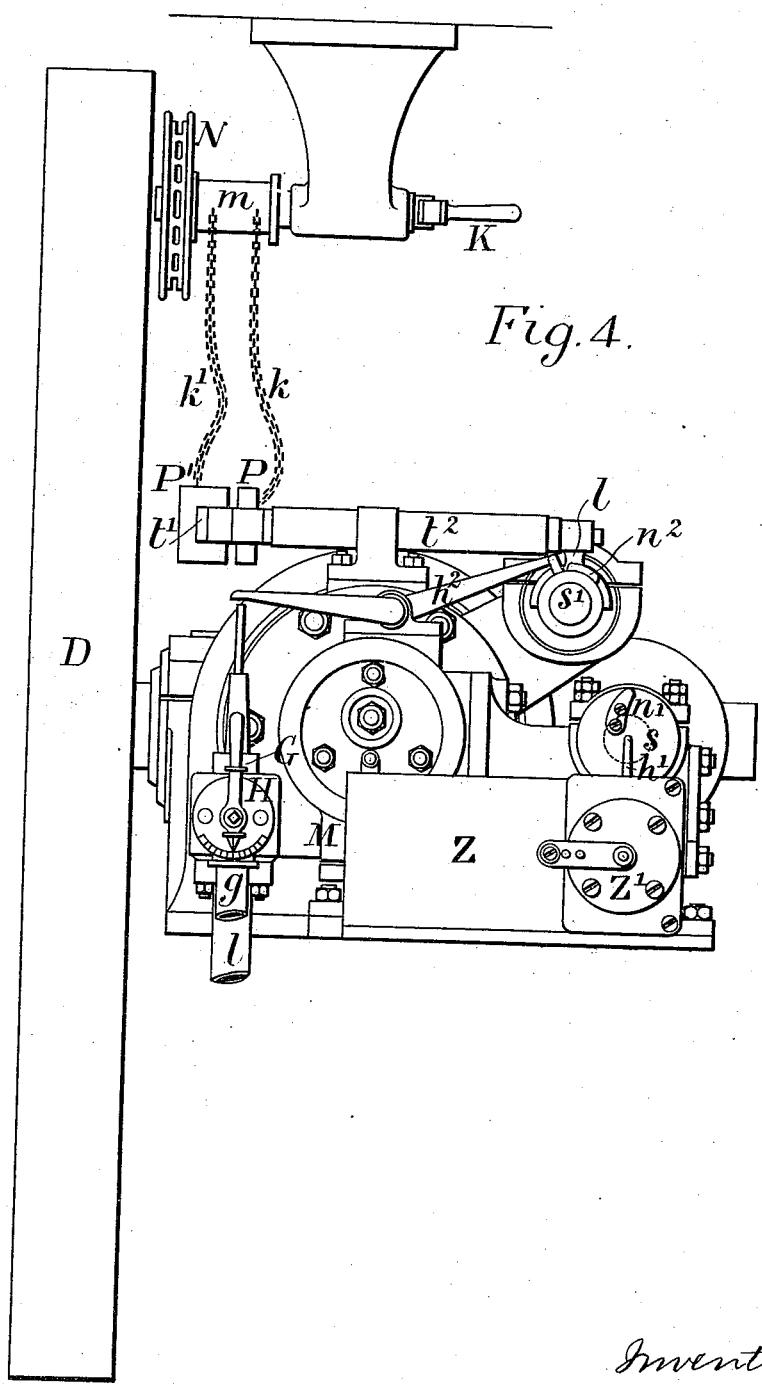

UNITED STATES PATENT OFFICE.

HERMANN SCHUMM, OF COLOGNE-DEUTZ, GERMANY, ASSIGNOR TO THE GAS-MOTOREN-FABRIK-DEUTZ, OF SAME PLACE.

GAS OR OIL MOTOR ENGINE.

SPECIFICATION forming part of Letters Patent No. 510,712, dated December 12, 1893.

Application filed February 24, 1893. Serial No. 463,626. (No model.) Patented in England January 12, 1893, No. 735; in France January 26, 1893, No. 227,450, and in Belgium January 30, 1893, No. 103,195.

*To all whom it may concern:*

Be it known that I, HERMANN SCHUMM, a citizen of Switzerland, residing at Cologne-Deutz, in the German Empire, have invented new and useful Improvements in Gas or Oil Motor Engines, (patented in England January 12, 1893, No. 735; in France January 26, 1893, No. 227,450, and in Belgium January 30, 1893, No. 103,195,) of which the following is a specification.

This invention has for its object the construction of a four stroke gas cycle or oil motor engine in such manner that while capable of developing considerable power, it shall occupy as small a space as possible in the direction of its width and height, so as to be specially applicable where the space for placing the engine is limited as in the case of vehicles to be driven by gas or oil motor engines. For this purpose two such engines are arranged in line with and opposite each other, both piston rods being connected to one and the same crank on the engine shaft, which also carries a flywheel. A countershaft extending along the entire length of the two engines is geared to the engine shaft by a pair of equal worm wheels so as to revolve at the same speed therewith; the said countershaft also carries at each end a centrifugal governor that governs the speed of the respective engine. This countershaft drives two smaller countershafts by means of gearing proportioned as two to one, so that the smaller countershafts are made to revolve at half the speed of the engine shaft. They carry the cams that actuate the levers of the discharge valves of the two cylinders. On the first named countershaft are arranged cams that act upon the levers of the gas admission valves, these cams being mounted on sleeves that can slide on the countershaft and are connected to or formed in one with the sleeves of the centrifugal governors, so that when the engines run too fast, the governors move the sleeves so that the cams are prevented from acting upon the gas valve levers during one or more strokes.

Figure 1 of the accompanying drawings shows the side elevation of the above described improved construction of gas or oil motor engine. Fig. 2 shows a part enlarged side view. Fig. 3 shows a part plan of the same, and Fig. 4 shows an end view.

C C are the cylinders of two gas motor engines, arranged in line with each other on opposite sides of the crankshaft B provided with a flywheel D, the piston rods being connected to one and the same crank B'.

Extending along the whole length of the engine, parallel with the longitudinal axis thereof, is a countershaft $s'$ carried in suitable bearings on the frame, and which is geared with the crankshaft by means of two equal worm wheels Q and Q', so that the countershaft revolves at the same speed as the engine shaft. This shaft $s'$ carries on its projecting ends two centrifugal governors T for regulating the speed of the engines, as will be presently described, and it is geared with two other countershafts $s\ s$ by means of spur gearing R R' proportioned as two to one, so that the shafts $s\ s$ revolve at half the speed of the engine shaft. These shafts are provided with cams $n$ and $n'$ for actuating the discharge valves of the engine cylinders and the magneto electrical devices for igniting the charges. By the above described arrangement of a countershaft $s'$ running at the same speed as the engine shaft, and two other countershafts $s\ s$ running at half the speed, the before mentioned compact construction of the combined engine is attained, as by this means it is rendered possible to fix the governors T directly on the countershaft $s'$, which is not possible with a countershaft running at half the speed of the engine. On the other hand, by the employment of equal sized transmission wheels Q Q' the wheel Q is only half the size it would have to be if the shaft $s'$ ran at half the speed of the engine shaft, so that the shaft $s'$ can be placed much closer against the sides of the engines and the governors consequently require much less room in width and height than with the ordinary arrangement. The gas supply valves at G supplied with gas through pipes $g$ and regulating cocks H are actuated by means of levers $h^2$ and cams $n^2$ on sleeves S carried by the shaft $s'$, so as to revolve therewith, but capable of sliding thereon, such sleeves being connected to or formed in one with the sleeves of the governors T. Thus when the engine runs too fast, the governors in moving the sleeves S along the shaft, bring the cams $n^2$ out of gear with the gas valve lever $h^2$, so that the gas valve remains closed at the next charging stroke or strokes, until the speed is reduced again. The air supply for the combustible charges enters through pipe $l$ into the admission valve chamber M of ordinary construction, in which is the usual admission valve, interposed between the gas and air-inlets and the working cylinder, said valve being of the ordinary kind and therefore not shown. In this chamber the air mixes with the gas supply from G, and on the automatic opening of the admission valve at the charging stroke of the piston, the charge of gas and air is drawn into the cylinder, such charge being then compressed by the return stroke and ignited at the end of such stroke by an electrical ignitor, supplied with current from a magneto electric apparatus $z$. This consists of permanent magnets having a rotatable armature whose axis $z'$ carries a lever $h'$ that is acted upon by a cam or wiper $n'$ on shaft $s$, so as to be turned thereby through a certain angle from its middle position. On the cam releasing the lever, this together with the armature is thrown rapidly back into its original position by a spring thereby producing a short but powerful electric current by means of a suitable interrupter in connection therewith, in a well known manner and thus producing the requisite igniting spark in the igniter in the cylinder. The discharge valve A of the engine is actuated by a lever $h$ pivoted at $h^3$ the roller $r$ of which lever is acted upon by a face cam $n$ formed on the face of the wheel R' on shaft $s$.

The speed of the combined engine is regulated directly without the use of variable transmission gear so as to run fast, medium or slow, by the following means: The governor or cam sleeve $s$ has a neck into which takes a forked lever $t$ fixed on a shaft $t'$ carried by a bracket $t^2$ on the engine frame. On the other end of the shaft $t'$ are mounted loosely two horizontal levers $p\ p'$ loaded with adjustable weights P P'. The levers are supported in the horizontal position by bearing with notches in their bosses on studs on the shaft $t'$, so that by means of this connection they tend to turn the shaft so as to cause lever $t$ to press the governor sleeve in the contrary direction to that in which the governor spring T' acts upon the sleeve and governor arms; the pressure thus exercised by the levers $p\ p'$ is so proportional as nearly to balance the contrary pressure of the governor spring, so that, the governor being very sensitive under these conditions, it will move the cam $n'$ out of gear with the gas valve lever when a comparatively slow speed of the engine is exceeded and consequently the engine will then run at a slow speed. If, now, say the weighted lever $p'$ be raised up sufficiently to take its pressure off the lever $t$ and sleeve $s$, then as the governor will be subject to an increased pressure of its spring, it will be less sensitive, and will only move the cam $n'$ out of gear when a certain higher speed is exceeded, so that the engine will then run at a medium speed. If on the other hand both levers be so raised up, the governor will be subject to the full pressure of its spring, and will allow the engine to run at a quick speed. For enabling such regulation of the action of both governors to be readily simultaneously effected by hand from one end of the combined engine, the two weighted levers $p\ p'$ of each engine are connected by slack chains $k\ k'$ to a drum $m$, the axis of which is suitably supported by a bracket and carries a chain pulley N, the two pulleys N being geared together by an endless pitch chain $k^2$. The chains $k'$ of the levers $p'$ have more slack than the chains $k$ of the levers $p$, so that on the simultaneous rotation of both drums $m$ by means of a crank handle K on the axis of the one drum, the chains $k$ will first be simultaneously coiled up so as to raise the levers $p\ p$, while on the further rotation of the drums the chains $k'$ will also be sufficiently wound up to raise the levers $p'\ p'$. The slack of the chains is so proportioned, that when the crank handle K is in the position I, Fig. 1, the governors are loaded by both the weighted levers, for the slow speed; when it is in the position II both the levers $p$ are raised, for the medium speed, and when it is in the position III all the levers are raised for the quick speed.

The other parts of the engine are constructed in the well known manner, and need therefore not be further described.

Having thus described the nature of my said invention and the best means I know of carrying the same into practical effect, I claim—

1. In a gas or oil motor engine, the combination of two four stroke cycle engine cylinders arranged in line with each other on opposite sides of an engine shaft B and having their piston rods connected to one and the same crank, a counter shaft $s'$ geared with the engine shaft so as to run at the same speed therewith and carrying the governors T T and the gas valve cams $n'\ n'$ and two further countershafts $s\ s$ geared with the shaft $s'$ so as to run at half the speed of the engine shaft and carrying the cams $n$ of the discharge valves A and the cams $n^2$ actuating magneto electric igniting apparatus Z, substantially as described.

2. In a gas or oil motor engine the combination of two four stroke cycle engine cylinders arranged in line with each other on opposite sides of an engine shaft B and having their piston rods connected to one and the same crank, a counter shaft $s'$ geared with the engine shaft so as to run at the same speed therewith and carrying the governors T T and the gas valve cams $n'\ n'$ two further countershafts $s\ s$ geared with the shaft $s'$ so as to run at half the speed of the engine shaft and carrying the cams $n$ of the discharge valves A and the cams $n^2$ actuating magneto electric igniting apparatus Z governor-sleeves S and weighted levers $p\ p'$ acting upon the governor sleeve for counteracting the pressure of the governor spring, said levers being capable of being raised so as to allow the governor spring to act with more or less pressure and thus to vary the sensitiveness of the governor and consequent speed of the engine substantially as described.

3. In a gas or oil motor engine the combination with a governor and governor-springs, of weighted levers $p\ p'$ acting upon the governor spring so as to vary the sensitiveness of the governor, of slack chains $k\ k'$ connecting said levers $p\ p'$ to drums $m$ so that by rotating said drums by means of pitch pulleys N, pitch chain $k^2$ and crank handle K the levers $p\ p'$ can be successively raised so as to allow the governor spring to act with greater or less pressure on the governor arms and thus vary the speed of the engine, substantially as described.

In testimony whereof I have signed my name to this specification, in the presence of two subscribing witnesses, this 7th day of February, A. D. 1893.

HERMANN SCHUMM.

Witnesses:
FRITZ SCHROEDER,
EVA HAUSEN.